United States Patent
Kawano et al.

(10) Patent No.: US 10,838,666 B2
(45) Date of Patent: Nov. 17, 2020

(54) INKJET RECORDING APPARATUS SYSTEM AND DISPLAY UNIT

(71) Applicant: Hitachi Industrial Equipment Systems Co., Ltd., Tokyo (JP)

(72) Inventors: Takashi Kawano, Tokyo (JP); Nobuhiro Harada, Tokyo (JP); Takahiro Takahashi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 16/308,665

(22) PCT Filed: Jun. 29, 2016

(86) PCT No.: PCT/JP2016/069196
§ 371 (c)(1),
(2) Date: Dec. 10, 2018

(87) PCT Pub. No.: WO2018/003024
PCT Pub. Date: Jan. 4, 2018

(65) Prior Publication Data
US 2019/0310803 A1  Oct. 10, 2019

(51) Int. Cl.
*G06F 3/12* (2006.01)
*B41J 2/14* (2006.01)
(Continued)

(52) U.S. Cl.
CPC ............... *G06F 3/12* (2013.01); *B41J 2/085* (2013.01); *B41J 2/09* (2013.01); *B41J 2/14* (2013.01);
(Continued)

(58) Field of Classification Search
CPC .......... G06F 3/12; G06Q 30/02; G06Q 30/00; G03G 21/00; B41J 2/17503; B41J 2/085;
(Continued)

(56) References Cited

U.S. PATENT DOCUMENTS 6,233,408 B1   5/2001 Allen
2005/0147440 A1  7/2005 Nakanishi et al.
(Continued)

FOREIGN PATENT DOCUMENTS

JP   2002-79688 A   3/2002
JP   2003-196540 A  7/2003
(Continued)

OTHER PUBLICATIONS

International Search Report (PCT/ISA/210) issued in PCT Application No. PCT/JP2016/069196 dated Sep. 13, 2016 with English translation (four (4) pages).
(Continued)

*Primary Examiner* — Bradley W Thies
(74) *Attorney, Agent, or Firm* — Crowell & Moring LLP

(57) ABSTRACT

In an existing service points granting method, service points are changed according to whether the ink ejection amount is corrected. However, changing the service points according to a user's purchases or purchase frequency for components or services has not been considered. A display unit displays products or services relevant to an ink jet recording apparatus, points corresponding to the products or services, and cumulative points possessed by each customer.

9 Claims, 4 Drawing Sheets

| PRODUCTS PURCHASE | | | |
|---|---|---|---|
| INK A  10 POINTS | INTENSIFICATION LIQUID A 5 POINTS | PRODUCTS A 30 POINTS | MAINTENANCE A 60 POINTS |
| INK B  15 POINTS | INTENSIFICATION LIQUID B 10 POINTS | PRODUCTS B 3 POINTS | MAINTENANCE B 80 POINTS |
| INK C  20 POINTS | INTENSIFICATION LIQUID C 15 POINTS | PRODUCTS C 55 POINTS | MAINTENANCE C 100 POINTS |
| | | | |
| ONE IJP  1000 POINTS | | | |
| THREE IJPS  3500 POINTS | | | |
| FIVE IJPS  6000 POINTS | | | |

ACCOUNT NUMBER: 123456789
STATUS: SILVER CLASS
CUMULATIVE POINTS: 1234 POINTS
[PURCHASE]

(51) Int. Cl.
  *B41J 2/165*   (2006.01)
  *B41J 29/38*   (2006.01)
  *G06Q 30/02*   (2012.01)
  *G06Q 30/00*   (2012.01)
  *G03G 21/00*   (2006.01)
  *B41J 2/175*   (2006.01)
  *B41J 2/085*   (2006.01)
  *B41J 2/09*    (2006.01)

(52) U.S. Cl.
  CPC .......... *B41J 2/165* (2013.01); *B41J 2/16517* (2013.01); *B41J 2/17503* (2013.01); *B41J 29/38* (2013.01); *G03G 21/00* (2013.01); *G06Q 30/00* (2013.01); *G06Q 30/02* (2013.01)

(58) Field of Classification Search
  CPC ... B41J 2/09; B41J 2/16517; B41J 2/14; B41J 2/165; B41J 29/38
  See application file for complete search history.

(56) References Cited

U.S. PATENT DOCUMENTS

2011/0238704 A1* 9/2011 Koike ................. G06Q 10/087
                                                            707/802

2012/0310773 A1   12/2012 Masuko et al.

FOREIGN PATENT DOCUMENTS

| | | |
|---|---|---|
| JP | 2004-234290 A | 8/2004 |
| JP | 2004-268432 A | 9/2004 |
| JP | 2005-271364 A | 10/2005 |
| JP | 2011-8605 A | 1/2011 |
| JP | 2011-197766 A | 10/2011 |
| JP | 2011-198331 A | 10/2011 |
| JP | 2011-243000 A | 12/2011 |
| JP | 2012-24958 A | 2/2012 |
| JP | 2013-186592 A | 9/2013 |
| WO | WO 2011/125884 A1 | 10/2011 |

OTHER PUBLICATIONS

Japanese-language Written Opinion (PCT/ISA/237) issued in PCT Application No. PCT/JP2016/069196 dated Sep. 13, 2016 (five (5) pages).

Japanese-language Office Action issued in counterpart Japanese Application No. 2018-524629 dated Jul. 9, 2019 with English translation (16 pages).

Extended European Search Report issued in European Application No. 16907257.6 dated Jan. 16, 2020 (eight (8) pages).

* cited by examiner

FIG. 1A

| PRODUCTS PURCHASE | | | |
|---|---|---|---|
| INK A  10 POINTS | INTENSIFICATION LIQUID A 5 POINTS | PRODUCTS A 30 POINTS | MAINTENANCE A 60 POINTS |
| INK B  15 POINTS | INTENSIFICATION LIQUID B 10 POINTS | PRODUCTS B 3 POINTS | MAINTENANCE B 80 POINTS |
| INK C  20 POINTS | INTENSIFICATION LIQUID C 15 POINTS | PRODUCTS C 55 POINTS | MAINTENANCE C 100 POINTS |
| | | | |
| ONE IJP  1000 POINTS | | | |
| THREE IJPS  3500 POINTS | | | |
| FIVE IJPS  6000 POINTS | | | |

ACCOUNT NUMBER  123456789
STATUS  SILVER CLASS
CUMULATIVE POINTS  1234 POINTS

[ PURCHASE ]

FIG. 1B

| POINT EXCHANGE | | | |
|---|---|---|---|
| INK A  50 POINTS | INTENSIFICATION LIQUID A 25 POINTS | PRODUCTS A 150 POINTS | MAINTENANCE A 180 POINTS |
| INK B  75 POINTS | INTENSIFICATION LIQUID B 50 POINTS | PRODUCTS B 15 POINTS | MAINTENANCE B 240 POINTS |
| INK C  100 POINTS | INTENSIFICATION LIQUID C 75 POINTS | PRODUCTS C 275 POINTS | MAINTENANCE C 300 POINTS |
| | | | |
| ONE IJP  10000 POINTS | | | |
| THREE IJPS  35000 POINTS | | | |
| FIVE IJPS  60000 POINTS | | | |

ACCOUNT NUMBER  123456789
STATUS  SILVER CLASS
CUMULATIVE POINTS  1234 POINTS

[ EXCHANGE ]

INKJET RECORDING APPARATUS SYSTEM AND DISPLAY UNIT

TECHNICAL FIELD

The present invention relates to an inkjet recording apparatus system and a display unit.

BACKGROUND ART

Patent Document 1 (JP 2012-24958 A) discloses a method of "calculating a high service point to be given when an ink discharge amount increases due to correction, as compared with a case where the ink discharge amount decreases due to correction."

CITATION LIST

Patent Document

Patent Document 1: JP 2012-24958 A

SUMMARY OF THE INVENTION

Problems to be Solved by the Invention

In a conventional inkjet recording apparatus, it was necessary to perform a manual collection of information, for example, tracing an order history of a customer, acquiring operation information from respective devices by a maintenance worker and the like, in order to calculate numerical values quantitatively representing a frequency of using consumable items, such as an ink used for printing in the inkjet recording apparatus, a solvent used for adjusting an ink concentration or cleaning when the inkjet recording apparatus stops operating, and components used in the inkjet recording apparatus including a filter for removing impurities in the ink, which are necessary for stably operating the inkjet recording apparatus, maintenance components, repair maintenance by the maintenance worker, or the like. Further, even if information was collected manually, there was no system that provides products or services to the user based on the collected customer information. Further, when a provider intends to manually provide products or services to a user, a cost increases due to labor and time to quantitatively calculate a profit acquired by the provider, whereby the profit that may be returned to the user is canceled out. Thus, such a provision could not be implemented.

Further, in the method described in the Patent Document 1, it is disclosed that a service point is changed depending on whether or not an ink discharge amount has been corrected. However, it is not disclosed that the service point is changed depending on a purchase amount, a purchase frequency and the like of components and services by a user.

An object of the present invention is to provide an inkjet recording apparatus system and a display unit that can be returned to a customer.

Solutions to Problems

In order to solve the above problem, for example, configurations described in the claims are adopted.

The present application includes a plurality of means for solving the above-mentioned problems. Examples of such means include a display unit that displays products or services related to an inkjet recording apparatus, the number of points corresponding to the products or services, and cumulative points possessed by each customer.

Effects of the Invention

According to the present invention, it is possible to provide an inkjet recording apparatus system and a display unit that can be returned to customers.

BRIEF DESCRIPTION OF THE DRAWINGS

FIG. 1A is an example of an input screen at the time of product purchase of the present invention, and FIG. 1B is an example of input screen at the time of product exchange of the present invention.

MODE FOR CARRYING OUT THE INVENTION

The present invention relates to a charge control type inkjet recording apparatus, and it relates to a service system that adds numerical values quantitatively indicating a frequency of using consumable items, such as an ink used for printing in the inkjet recording apparatus, a solvent used for adjusting an ink concentration or cleaning when the inkjet recording apparatus stops operating, components used in the inkjet recording apparatus including a filter for removing impurities in the ink, which are necessary for operating the inkjet recording apparatus, and maintenance components or repair maintenance by a maintenance worker, and provides products and services according to previously added numerical values to an user of the inkjet recording apparatus.

Hereinafter, embodiments of the present invention will be described with reference to FIGS. 1 to 4.

A printing operation of an IJP will be described with reference to FIG. 2.

Figure 2:
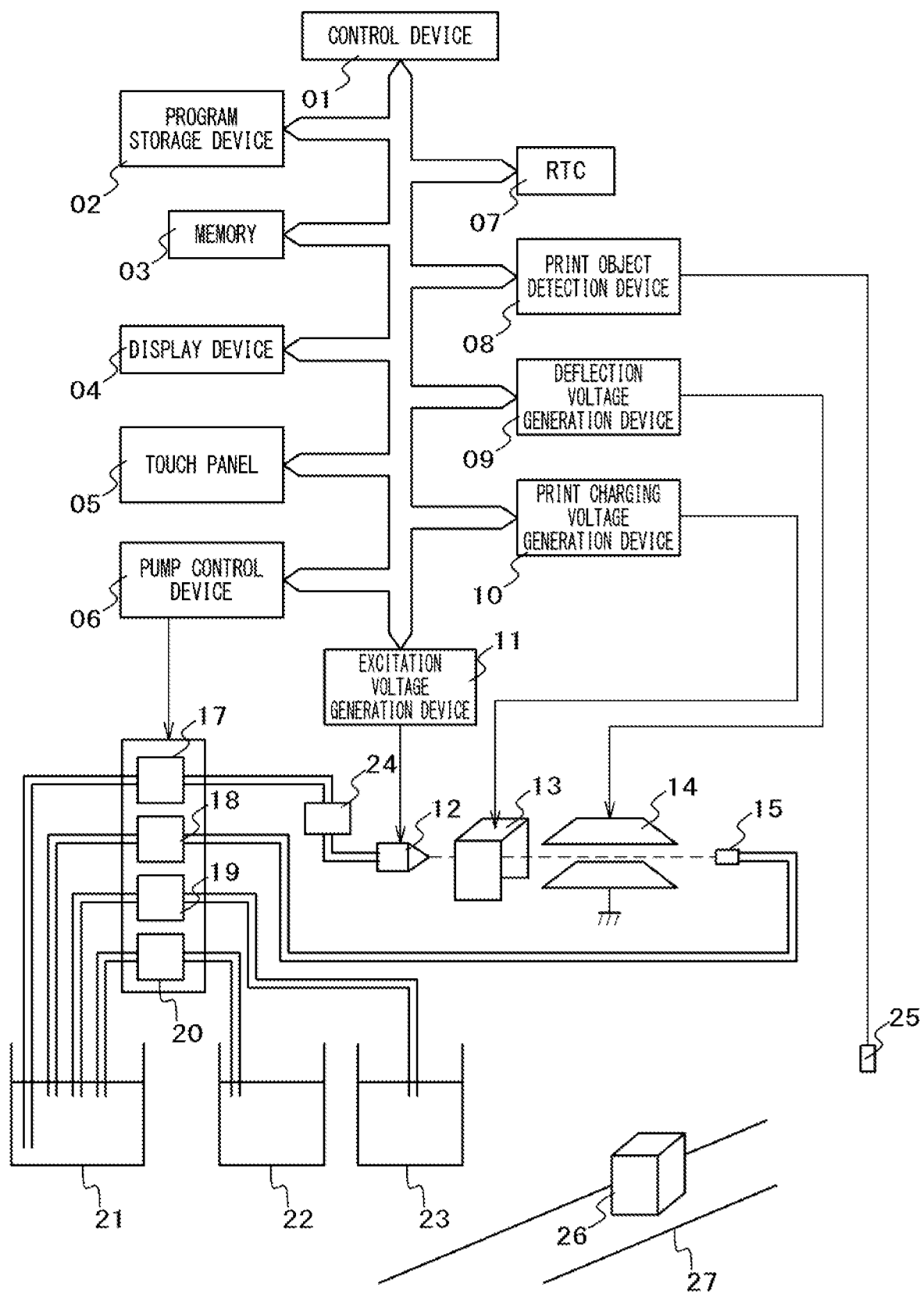
FIG. 2 is a block diagram of an IJP main body.

FIG. 2 is a block diagram illustrating a configuration and an operation of the IJP according to the present invention.

In FIG. 2, a control device 01 is a micro processing unit (MPU) that controls the entire IJP. Further, the control device 01 is connected, via a bus, to a program storage device 02, a memory 03, a display device 04, a touch panel 05, a pump control device 06, an RTC 07, a print object detection device 08, a deflection voltage generation device 09, a print charging voltage generation device 10, and an excitation voltage generation device 11.

The program storage device 02 is a device that stores in advance a program to be executed in the MPU 01, data necessary for operating the IJP and display data.

The memory 03 is divided into a program execution area and a data storage area for use. The program execution area is an area for executing a program stored in the program storage device 02 called by the MPU 01. The data storage area is an area for storing data created by the user and a character string to be printed.

The display device 04 is a device that converts the display data stored in the program storage device 02 into a format for displaying the display data and displays the data. The user recognizes a state of the IJP and the like depending on a screen displayed on the display device 04.

The touch panel 05 is installed over the display device and outputs a voltage value corresponding to a touched position when the user touches a surface of the touch panel 05. The control device 01 reads this voltage value to detect coordinates of the touched position. When the user touches an icon or a button displayed on the display device 04 via the touch panel 05, the control device 01 determines an input by the user from the coordinates of the touched position, calls a program corresponding to the input from the program storage device 02, and executes the program.

An ink intensification liquid mixing tank 21 is a device for storing a mixed liquid of an ink used for printing on a print object 26 and an intensification liquid. A liquid in the ink intensification liquid mixing tank 21 is pressurized by a supply pump 17 operating in response to a command from the MPU 01 to be supplied to a nozzle 12 through an ink supply pipe and a filter 24.

The nozzle 12 is a device that ejects the mixed liquid of the ink and the intensification liquid. Further, a piezoelectric element that converts an electrical signal into a mechanical signal is attached to the nozzle 12, and the mixed liquid of the ink ejected from the nozzle 12 and the intensification liquid is made into particles by applying an excitation voltage signal generated by the excitation voltage generation device 11 to the piezoelectric element.

The ejected ink particles pass through a space formed between both end portions of a U-shaped charging electrode 13. A charging voltage corresponding to character information for printing generated by the print charging voltage generation device 10 is applied to the charging electrode 13. The ink particles are charged by the charging voltage applied when passing through the space formed between both end portions of the charging electrode 13. Further, the ink particles which have passed through the space formed between both end portions of the charging electrode 13 pass between deflecting electrodes 14. A deflection voltage generated by the deflection voltage generation device 09 is applied to the deflection electrodes 14. The ink particles are deflected according to a charging amount when passing through a deflection electric field formed by the deflection voltage, and the deflected ink particles are printed on the print object 26.

An ink recovery port 15 is for collecting ink particles not used for printing. The ink particles recovered from the ink recovery port 15 are sucked by a recovery pump 18 operating in response to a command from the MPU 01, and are returned to the ink intensification liquid mixing tank 21 via an ink recovery pipe.

A print object conveyance device 27 conveys the print object 26 to be printed by the IJP at a predetermined speed, and its conveyance direction is a direction orthogonal to the deflection direction of the ink particle.

A print object sensor 25 is a device that detects the print object 26 to be conveyed by the print object conveyance device 27. When detecting the print object 26, the print object sensor 25 transmits a print object detection signal to the print object detection device 08. The print object detection device 08 is a device that transmits the print object detection signal transmitted from the print object sensor 25 to the MPU 01. Upon receiving the print object detection signal, the MPU 01 detects that the print object 26 has arrived at a printing area of the IJP. Upon detecting that the print object 26 has reached the printing area, the MPU 01 starts processing for printing on the print object 26, and transmits a printing character string stored in the memory 03 to a print charging voltage generation device 10 via the bus. At the same time, the MPU 01 applies a charging voltage to the charging electrode 13.

In order to supplement the ink used for printing, the MPU 01 transfers an amount of ink consumed from the ink tank 23 to the ink intensification liquid mixing tank 21 by an ink supply pump 19. Further, the intensification liquid, which is an ink liquid component volatilized by contact with air while the IJP is in operation, is transferred from an intensification liquid tank 22 to the ink intensification liquid mixing tank 21 by an intensification liquid supply pump 20.

As described above, the IJP is constituted and operated by various components such as an ink, an intensification liquid, a pump and a control device. In the IJP, there are components such as a filter or a pump that need to be exchanged regularly, as well as the ink or the intensification liquid as a consumable item, and it is essential for stable operation to properly replenish or exchange such components.

Figure 3:
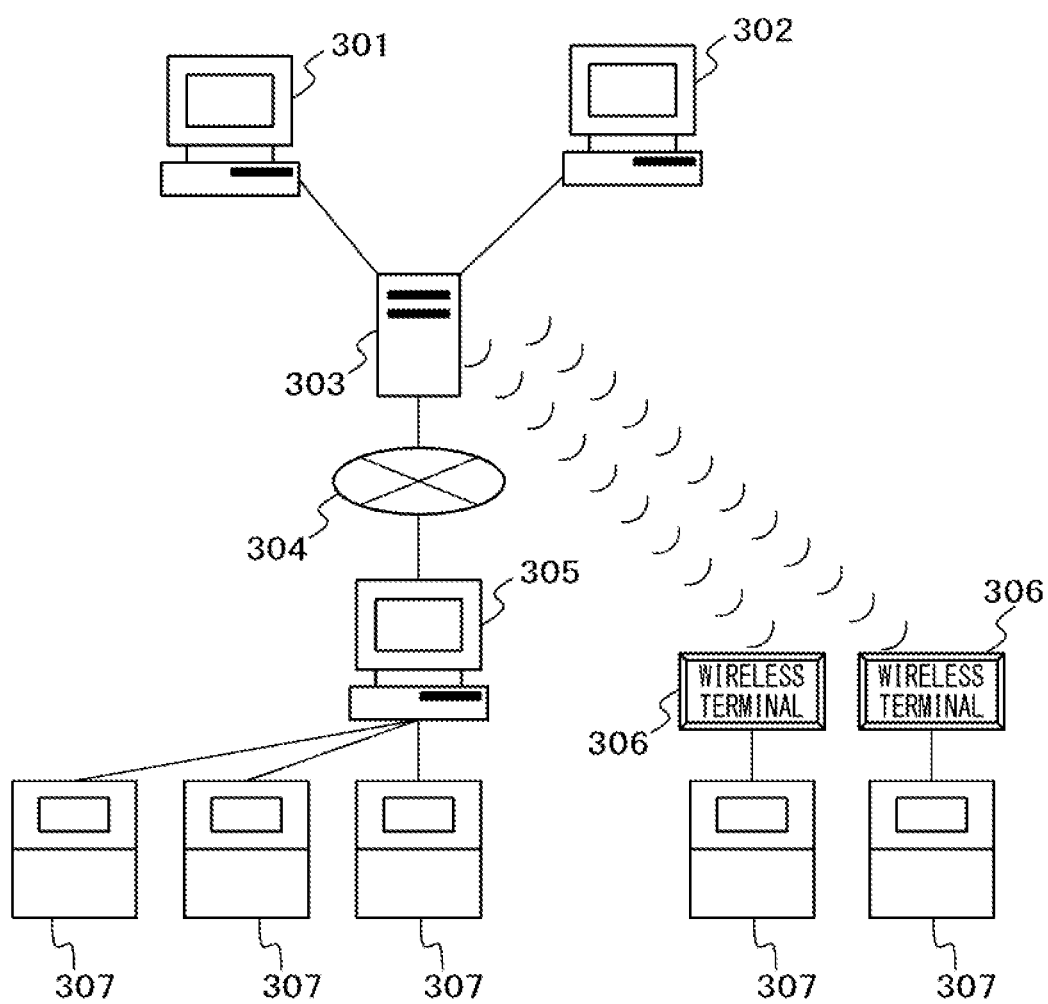
FIG. 3 is a configuration diagram of an inkjet recording apparatus system of the present invention.

FIG. 3 shows an example of a configuration of an inkjet recording apparatus system according to the present invention.

A personal computer 301 or a personal computer 302 is connected to a server 303 via an internet 304 or a dedicated line. The server 303 can store information recorded in an IJP main body including user information or operation information of an IJP 307. An operation time, the number of prints and the like as the operation information of the IJP 307 transfer information to the server 303 via the internet 304 via a personal computer 305. In addition, the operation time, the number of prints, and the like as the operation information of the IJP 307 transfer information to the server 303 via a wireless terminal 306.

Here, the personal computer 301 is used by a maintenance worker or a provider who provides a work such as a service maintenance and is used to propose a maintenance service including a regular service maintenance based on the operation information of the user grasped. A plurality of service maintenances is prepared according to collected operation information. For example, the service maintenance includes exchange service of consumable items such as an ink and a solvent, cleaning service of a nozzle portion or a circulation system portion, and the like.

In addition, the personal computer 302 is used by the user. The personal computer 302 is used to purchase an ink, an intensification liquid, components, service maintenance, an IJP main body used for an IJP possessed by the user or to consume acquired points. A display unit of the personal computer 302 will be described later with reference to FIG. 1.

FIG. 1*a* is an input screen at the time of purchasing a product in the present invention. The input screen is displayed on the personal computer 302 in FIG. 3.

Necessary data to be operated and displayed on the screen and software to be executed are stored on a server. The user may access the pertinent server from a personal computer, a mobile terminal, etc. via an internet, a dedicated line, etc., and specify the user by inputting specific information such as a password or an account number to perform a user authentication.

When the user authentication is completed normally, products such as an ink, an intensification liquid, components required to be exchanged regularly, regular service maintenance program and an IJP main body to be used for the IJP, and points added at the time of purchasing the products are displayed on the screen. Further, an account number as the user information, a status indicating a frequency of use by the user, cumulative points accumulated for each account, and the next recommended service maintenance contents and time are displayed. When the user selects desired contents from the screen and purchases, points corresponding to the selected product are added for each account, stored in the server, and reflected in a column of cumulative points of a product purchase screen. Depending on the status, the points of products and services may differ or a discount rate (not illustrated) may differ. A discount amount is not illustrated. However, for example, 10% discount from a price of products or service for the status of gold, 8% discount for the status of silver, 5% discount for the status of bronze, and the like may be set.

On the other hand, FIG. 1b illustrates an input screen at the time of exchanging the products in the present invention.

Necessary data to be operated and displayed on the screen and software to be executed are stored on a server. The user accesses the pertinent server from a personal computer, a mobile terminal, etc. via an internet, a dedicated line, etc., and may specify the user by inputting specific information such as a password or an account number to perform a user authentication.

When the user authentication is completed normally, points needed at the time of exchanging the points for products such as an ink, an intensification liquid, components required to be exchanged regularly, regular service maintenance program and an IJP main body to be used for the IJP, and points added at the time of purchasing the products are displayed on the screen. In addition, an account number as the user information, a status indicating a frequency of use by the user, cumulative points added for each account, and the like are displayed. The user selects desired contents to exchange the points for the products, the service program, the IJP main body or the like. After the exchange, the points are subtracted from the account, stored in the server, and reflected in a column of cumulative points of a point exchange screen.

Figure 4:
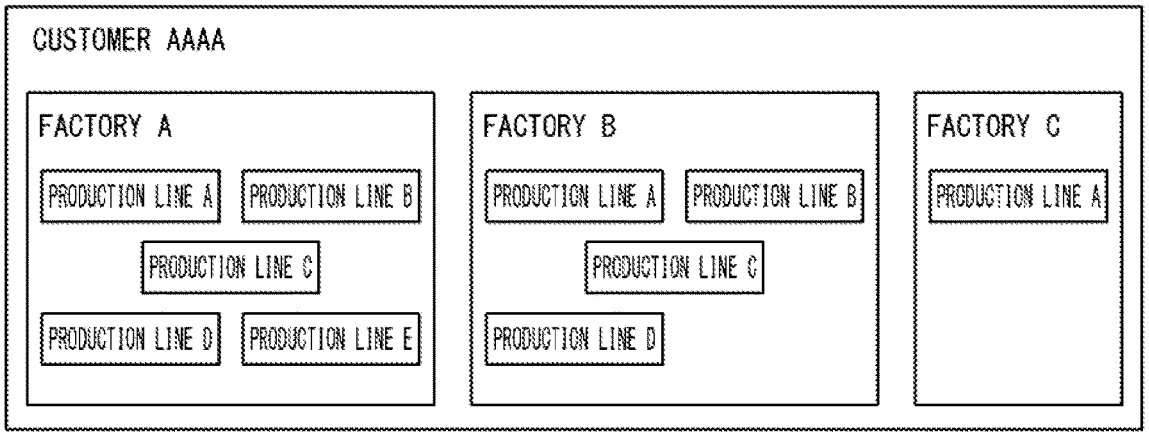
FIG. 4 is an example of integrated data of the present invention.

Although the screens illustrated in FIGS. 1a and 1b are described above as being displayed on the personal computer 302 in FIG. 3, they may be displayed on the display device (04 in FIG. 2) of the IJP 307 illustrated in FIG. 3. Even in this case, the user can freely purchase the products and exchange points, as in the case of being displayed on the personal computer 302. FIG. 4 is an example relating to customer accounts.

In FIG. 4, the user has a plurality of factories, and each factory has a plurality of production lines or a single production line. When it is assumed that an IJP is installed and operating for each production line, an ink, an intensification liquid, components, and service maintenance are required for an operation of each IJP. Accounts may be created freely per one IJP, a production line, a factory or a customer. If the user is the same, it is allowed to merge accounts or points, thereby aggregating the points.

Points or discount rates of products or services shown on the product purchase screen illustrated in FIG. 1a differ depending on the status. However, since the pertinent status is determined based on the cumulative point of each account, a higher status may be recognized by aggregating the points.

In the above description, it is explained that the status is determined based on the cumulative points of each account, but it may be determined based on the frequency of using each account. In this case, it is possible to prompt the customer to periodically purchase the products or services by setting the status so that the customer is more likely to raise the status as the customer frequently purchases products or services.

As described above, the present application adds numerical values quantitatively indicating a frequency of using consumable items, such as an ink used for printing in the inkjet recording apparatus, a solvent used for adjusting an ink concentration or cleaning when the inkjet recording apparatus stops operating, components used in the inkjet recording apparatus including a filter for removing impurities in the ink, which are necessary for operating the inkjet recording apparatus, and maintenance components or a maintenance by a maintenance worker, and reflects the added numerical values in a price of the consumable item or the maintenance component, a price of the repair maintenance by the maintenance worker, a price of the inkjet recording apparatus, and the like to return a profit to the user, thereby having an effect of supplying the consumable item, the maintenance component and a regular maintenance more reasonably and contributing to replacement of aging old-type ones to increase a productivity of the user.

REFERENCE SIGNS LIST

01 MPU
02 program storage device
03 memory
04 display device
05 touch panel
06 pump control device
07 RTC
08 print object detection device
09 deflection voltage generation device
10 print charging voltage generation device
11 excitation voltage generation device
12 nozzle
13 charging electrode
14 deflection electrode
15 ink recovery port
17 supply pump
18 recovery pump
19 ink supply pump
20 intensification liquid supply pump
21 ink intensification liquid mixing tank
22 intensification liquid tank
23 ink tank
25 print object sensor
26 print object
27 print object conveyance device
301 personal computer
302 personal computer
303 server
304 internet
305 personal computer
306 wireless terminal
307 IJP

The invention claimed is:

1. An inkjet recording apparatus system comprising:
an inkjet recording apparatus including a nozzle for ejecting a mixed liquid of ink and an intensification liquid;
a server that collects operation information of the inkjet recording apparatus;
a first information processing terminal for proposing a maintenance service, the first information processing terminal being coupled to the server and preparing a plurality of service maintenances corresponding to the operation information including a cleaning service of the nozzle of the inkjet recording apparatus;
a second information processing terminal that is coupled to the server and the first information processing terminal, the second information processing terminal including a display unit that displays the ink, the intensification liquid, components required to be exchanged regularly, a service maintenance program relating to the inkjet recording apparatus, a number of points corresponding to products or the service maintenance program, and cumulative points possessed by each customer;

wherein the number of points corresponding to a selected product or the service maintenance program selected from the display unit are stored in the server.

2. The inkjet recording apparatus system according to claim 1, wherein the number of points corresponding to the selected product or the service maintenance program displayed on the display unit varies depending on the status of each customer.

3. The inkjet recording apparatus system according to claim 1, wherein the display unit causes each customer to purchase the products or the service maintenance program associated with the inkjet recording apparatus or exchanges points using cumulative points.

4. The inkjet recording apparatus system according to claim 1, wherein a status of each customer is displayed on the display unit.

5. The inkjet recording apparatus system according to claim 4, wherein the status of each customer is determined based on the cumulative points or a frequency of use of each customer.

6. The inkjet recording apparatus system according to claim 1, wherein the display unit displays at least one of a maintenance time, a maintenance content, and a replacement time of the inkjet recording apparatus based on operation information of each customer.

7. The inkjet recording apparatus system according to claim 6, wherein the operation information of each customer is an operation time or a number of times of printing of the inkjet recording apparatus.

8. The inkjet recording apparatus system according to claim 1, wherein user authentication is performed, the point is exchanged for the product selected by a user or the service maintenance program, and after exchange the point is subtracted from an account and stored in the server.

9. The inkjet recording apparatus system according to claim 8, wherein the account is created in units of the inkjet recording apparatus, a unit of a production line, a unit of a factory, and a unit of a customer, and wherein the server permits to merge the account and to merge the points for a same user.

* * * * *